(12) United States Patent
Nakagawa et al.

(10) Patent No.: US 8,901,454 B2
(45) Date of Patent: Dec. 2, 2014

(54) ARC WELDING CONTROL METHOD

(75) Inventors: Akira Nakagawa, Osaka (JP); Atsuhiro Kawamoto, Hyogo (JP); Junji Fujiwara, Osaka (JP); Masaru Kowa, Osaka (JP)

(73) Assignee: Panasonic Corporation, Osaka (JP)

( * ) Notice: Subject to any disclaimer, the term of this patent is extended or adjusted under 35 U.S.C. 154(b) by 158 days.

(21) Appl. No.: 13/502,390

(22) PCT Filed: Jul. 11, 2011

(86) PCT No.: PCT/JP2011/003951
§ 371 (c)(1),
(2), (4) Date: Apr. 17, 2012

(87) PCT Pub. No.: WO2012/032703
PCT Pub. Date: Mar. 15, 2012

(65) Prior Publication Data
US 2012/0199567 A1    Aug. 9, 2012

(30) Foreign Application Priority Data

Sep. 10, 2010   (JP) .................................. 2010-202589

(51) Int. Cl.
*B23K 9/00*   (2006.01)
*B23K 9/12*   (2006.01)
(Continued)

(52) U.S. Cl.
CPC .............. *B23K 9/092* (2013.01); *B23K 9/0671* (2013.01); *B23K 9/073* (2013.01); *B23K 9/093* (2013.01); *B23K 9/095* (2013.01); *B23K 9/124* (2013.01); *B23K 9/173* (2013.01)
USPC .............. 219/137 R; 219/125.1; 219/130.01; 219/130.21; 219/130.33; 219/137.3; 219/137.71; 219/121.11; 219/121.14; 219/121.17; 219/121.2; 219/121.35; 219/121.38; 219/121.41; 219/121.44; 219/121.46; 219/121.59; 219/124.1; 219/124.21; 219/124.22; 219/124.31; 219/124.32; 219/124.33; 219/124.34; 219/124.4; 219/124.5; 219/137 PS; 219/137.2

(58) Field of Classification Search
CPC ...... B23K 9/073; B23K 9/125; B23K 9/0956; B23K 9/0671; B23K 9/126
USPC .............. 219/125.1, 130.01, 130.21, 130.33, 219/137 R, 137.7, 137.71
See application file for complete search history.

(56) References Cited

U.S. PATENT DOCUMENTS 4,201,906 A * 5/1980 Puschner ................. 219/137 PS
4,618,760 A * 10/1986 Murch et al. ............. 219/130.4
(Continued)

FOREIGN PATENT DOCUMENTS

JP    59070469 A    4/1984
JP    01321078 A    12/1989
(Continued)

OTHER PUBLICATIONS

International Application Serial No. PCT/JP2011/003951, International Search Report mailed Oct. 18, 2011, 1 pg.

*Primary Examiner* — Dana Ross
*Assistant Examiner* — Gyounghyun Bae
(74) *Attorney, Agent, or Firm* — RatnerPrestia

(57) ABSTRACT

In a method for controlling pulse arc welding where an arc is created between a wire and a base material, a pulse waveform different from the pulse waveform for steady-state welding is outputted when a predetermined time has passed since short-circuit welding control was started at arc start, and after a sufficiently large melt pool is formed, the pulse waveform for the steady-state welding is outputted. This reduces the generation of spatters after an arc is created and until the arc is stabilized.

20 Claims, 6 Drawing Sheets

(51) Int. Cl.

| | | |
|---|---|---|
| *B23K 1/00* | (2006.01) | |
| *B23K 33/00* | (2006.01) | |
| *B23K 9/10* | (2006.01) | |
| *B23K 15/00* | (2006.01) | |
| *B23K 9/28* | (2006.01) | |
| *B23K 9/09* | (2006.01) | |
| *B23K 9/067* | (2006.01) | |
| *B23K 9/073* | (2006.01) | |
| *B23K 9/095* | (2006.01) | |
| *B23K 9/173* | (2006.01) | |

(56) References Cited

U.S. PATENT DOCUMENTS

| | | | |
|---|---|---|---|
| 4,954,691 A * | 9/1990 | Parks et al. | 219/137 PS |
| 5,667,709 A * | 9/1997 | Ueyama et al. | 219/137 PS |
| 6,015,964 A * | 1/2000 | Baker | 219/130.33 |
| 6,087,626 A * | 7/2000 | Hutchison et al. | 219/130.21 |
| 6,384,376 B1 * | 5/2002 | Plottier et al. | 219/130.51 |
| 6,627,850 B1 * | 9/2003 | Koga et al. | 219/137.71 |
| 6,730,875 B2 * | 5/2004 | Hsu | 219/137 PS |
| 7,598,475 B2 * | 10/2009 | Kawamoto et al. | 219/130.51 |
| 7,842,903 B2 * | 11/2010 | Myers | 219/130.51 |
| 8,153,933 B2 * | 4/2012 | Yamazaki et al. | 219/130.51 |
| 2005/0061791 A1 * | 3/2005 | Matus et al. | 219/130.21 |
| 2006/0207983 A1 * | 9/2006 | Myers et al. | 219/137 PS |
| 2007/0181548 A1 * | 8/2007 | Kaddani et al. | 219/130.21 |
| 2009/0242534 A1 * | 10/2009 | Artelsmair et al. | 219/137 PS |
| 2010/0193486 A1 * | 8/2010 | Hirota et al. | 219/125.1 |
| 2012/0097654 A1 * | 4/2012 | Kawamoto et al. | 219/125.1 |

FOREIGN PATENT DOCUMENTS

| | | |
|---|---|---|
| JP | 03297564 A | 12/1991 |
| JP | 07155948 A | 6/1995 |

* cited by examiner

ARC WELDING CONTROL METHOD

This Application is a U.S. National Phase Application of PCT International Application PCT/JP2011/003951.

TECHNICAL FIELD

The present invention relates to a method for controlling pulse arc welding in which pulse arc welding is performed while feeding a welding wire as a consumable electrode. The invention relates more particularly to the control of arc starting.

BACKGROUND ART

In welding industry in recent years, there is an increasing demand for high-quality welding to improve productivity. It is particularly demanded to prevent spatters at arc start. It takes time to form a melt pool on the base material after an arc is started, and therefore, it takes time to stabilize the arc. For this reason, a lot of spatters are generated at arc start, and often adhere to the base material. In some cases, an additional process is required to remove adhered spatters, thereby decreasing welding productivity. In other cases, products are sold with spatters adhered to the base material without performing the additional process. This greatly impairs the product value.

According to the well-known conventional control of arc starting, the short-circuit welding control is switched to pulse welding control when a predetermined time has passed since short-circuit welding control was started at arc start (see, for example, Patent Literature 1).

FIG. 4 is a schematic configuration view of a conventional arc welding apparatus including input power supply 101, main transformer 102, primary rectifier device 103, switching element 104, reactor 105, and secondary rectifier device 106. Primary rectifier device 103 receives and rectifies the output of input power supply 101 and outputs the rectified result. Switching element 104 converts the DC output received from primary rectifier device 103 into an AC output so as to control a welding output. Main transformer 102 changes the voltage of the AC output received from switching element 104. The output of main transformer 102 is outputted as the welding output via secondary rectifier device 106 and reactor 105. Secondary rectifier device 106 rectifies the secondary output of main transformer 102.

The conventional arc welding apparatus further includes setting unit 135, which sets and outputs various parameters such as pulse current magnitude or pulse time. Setting unit 135 sets these parameters based on various setting conditions such as set current, set voltage, wire feed amount, the type of the shielding gas, the type of wire, the diameter of the wire, and welding method, which are entered through unillustrated input means. To set these parameters, setting unit 135 includes an unillustrated storage unit for storing a table or a formula to determine the parameters, and an unillustrated calculation unit.

The conventional arc welding apparatus further includes welding current detector 108, welding voltage detector 109, drive unit 134, short-circuit welding controller 136, pulse welding controller 137, and switching unit 138. Welding voltage detector 109 detects a welding voltage, and welding current detector 108 detects a welding current. Short-circuit welding controller 136 receives the outputs of welding current detector 108, welding voltage detector 109, and setting unit 135, and then outputs a command for performing short-circuit control.

As will be described later, short-circuit welding controller 136 performs short-circuit welding control in which short-circuiting and arcing are repeated for a predetermined time after the arc is started. Pulse welding controller 137 receives the outputs of welding current detector 108, welding voltage detector 109, and setting unit 135, and then outputs a command for performing pulse welding control. Short-circuit welding controller 136 and pulse welding controller 137 compares, for example, the output signals of welding current detector 108 and welding voltage detector 109 with parameter values (command values) received from setting unit 135. When the values of the output signals of welding current detector 108 and welding voltage detector 109 do not agree with the parameter values, short-circuit welding controller 136 and pulse welding controller 137 control the welding current and the welding voltage so that the values of the output signals agree with the parameter values.

Switching unit 138 receives the output of setting unit 135, and notifies drive unit 134 the timing to switch from short-circuit welding control to pulse welding control. Switching unit 138, which has a time-counting function, counts the time after the output of setting unit 135 is received and until a predetermined time elapses. Drive unit 134 receives the outputs of short-circuit welding controller 136, pulse welding controller 137, and switching unit 138. Drive unit 134 provides switching element 104 with either the output of short-circuit welding controller 136 or the output of pulse welding controller 137 according to the output of switching unit 138.

The following is a description of, with reference to FIGS. 4 and 5, a method for controlling arc starting by using the arc welding apparatus thus structured.

FIG. 5 shows an example of waveforms of a wire feed speed, a welding voltage and a welding current with time in consumable electrode arc welding. FIG. 6 shows the behavior of droplets formed in arc welding when the base material has a small melt pool. In the waveforms shown in FIG. 5, at a time T1, the start of welding is commanded. At a time T2, arc current is supplied and an arc is created to start short-circuit welding control. At a time T3, short-circuit welding control is switched to pulse welding control.

At the time T1 when the arc is created, drive unit 134 transmits the output of short-circuit welding controller 136 to switching element 104 based on the output of switching unit 138. Switching unit 138 counts the time elapsed since the time T2 when the welding current is detected. At the time T3 when the predetermined time elapses, drive unit 134 transmits the output of pulse welding controller 137 to switching element 104 so as to switch short-circuit welding control to pulse welding control.

From the time T2 when the arc is created until the time T3 when welding control is switched, short-circuit control is performed based on the output of short-circuit welding controller 136. When the time T3 is reached after the predetermined time has passed since time T2, switching unit 138 instructs drive unit 134 to switch welding control. At this moment, switching element 104 receives the output of pulse welding controller 137, and switches short-circuit welding control to pulse welding control. From the time T3 onward, pulse welding controller 137 performs pulse welding control.

Thus, according to the conventional method for controlling arc starting by using the arc welding apparatus, short-circuit welding control is performed after an arc starting current is supplied. This prevents arc interruption due to unstable arc when pulse welding control is started immediately after the arc starting current is supplied, and also prevents the generation and adhesion of spatters.

In the conventional arc welding apparatus, the short-circuit welding control is switched to pulse welding control when the predetermined time has passed since short-circuit welding control was started at arc start. This has reduced the generation of spatters at arc start.

As shown in FIG. 6, however, the melt pool formed during short-circuit welding immediately after an arc is started is much smaller than the melt pool formed during the subsequent pulse welding. Therefore, droplets formed immediately after pulse welding is started may spatter and adhere to the base material without being transferred to the melt pool. Thus, the conventional method can reduce the generation of spatters immediately after the arc is started, but cannot reduce the generation of spatters immediately after short-circuit welding control is switched to pulse welding control. As a result, large spatters may adhere to the base material.

CITATION LIST

Patent Literature

PTL 1: Japanese Patent Unexamined Publication No. H03-297564

SUMMARY OF THE INVENTION

The present invention is directed to provide a method for controlling arc starting so as to reduce the generation of spatters after an arc is created and until the arc is stabilized.

To solve the above-described problem, according to the method of the present invention for controlling arc welding, an arc is created between a welding wire as a consumable electrode and a base material as the object to be welded. Short-circuit welding is started either at the time when the start of welding is commanded or the time when the start of welding is commanded and the contact between the welding wire and the base material is detected. The short-circuit welding is switched to pulse welding when a predetermined time has passed. The period to perform the pulse welding includes a first pulse-welding period and a second pulse-welding period following the first pulse-welding period. At least one of a pulse rising slope and a pulse falling slope in the first pulse-welding period is controlled to be gentler than at least one of a pulse rising slope and a pulse falling slope in the second pulse-welding period.

With this method, a pulse waveform different from the pulse waveform for steady-state welding is outputted when a predetermined time has passed since short-circuit welding control was started at arc start, and after a sufficiently large melt pool is formed, the pulse waveform for the steady-state welding is outputted. In this case, droplets formed immediately after short-circuit welding is switched to pulse welding are transferred to the melt pool without spattering. This reduces the generation of spatters after an arc is created and until the arc is stabilized.

DESCRIPTION OF EMBODIMENTS

Figure 1:
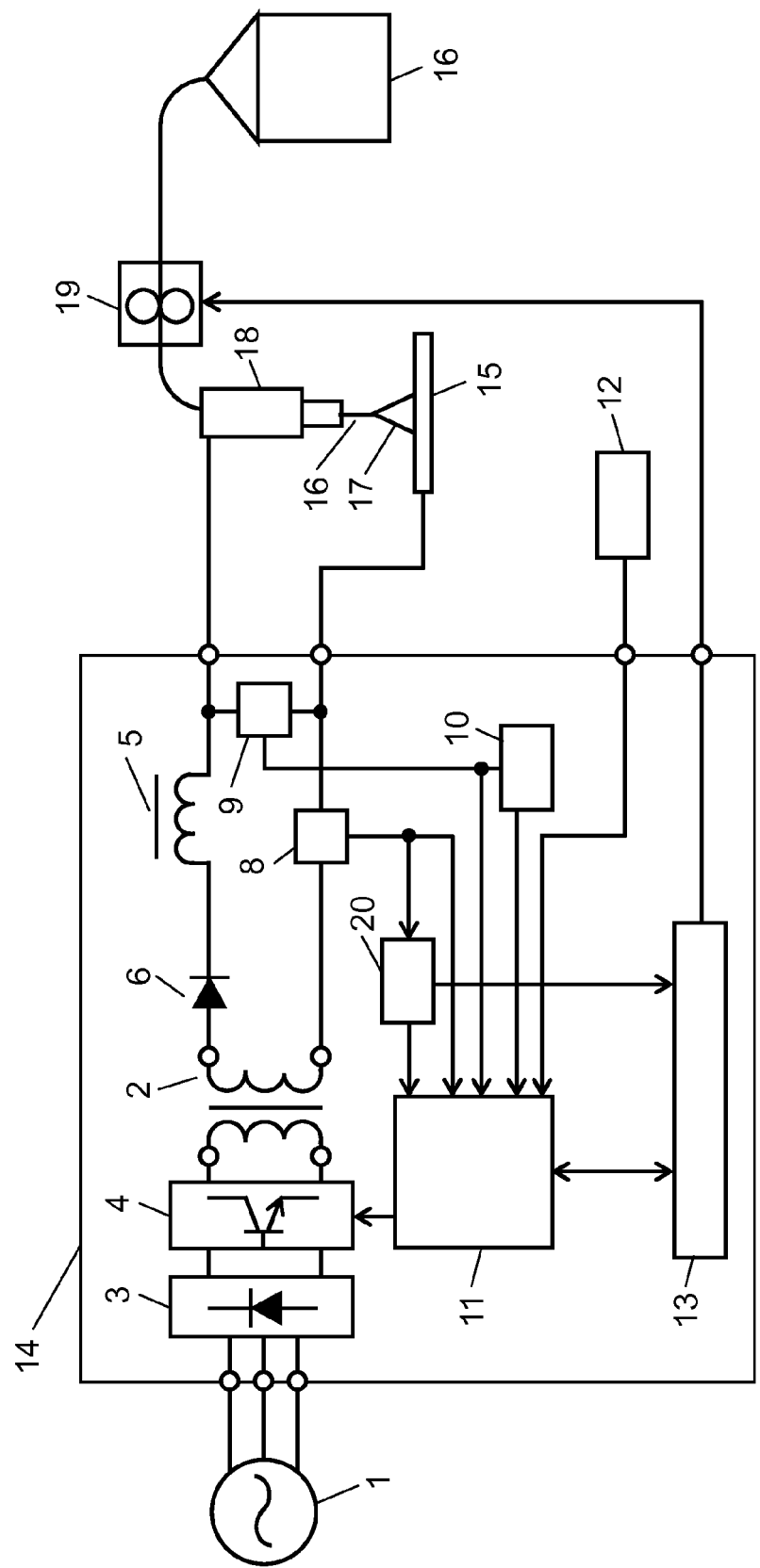
FIG. 1 is a schematic configuration view of an arc welding apparatus according to first and second exemplary embodiments of the present invention.

Embodiments of the present invention will be described as follows with reference to drawings. In these drawings, the same components are denoted by the same reference numerals, and hence, the description thereof may be omitted.

First Exemplary Embodiment

FIG. 1 is a schematic configuration view of an arc welding apparatus according to the present first exemplary embodiment. In FIG. 1, the arc welding apparatus includes welding power supply 14, which includes main transformer 2, primary rectifier device 3, switching element 4, reactor 5 (generally also referred to as DCL), secondary rectifier device 6, welding current detector 8, welding voltage detector 9, short-circuit/arc detector 10, output controller 11, wire feed speed controller 13, and time keeper 20.

The arc welding apparatus further includes input power supply 1. Primary rectifier device 3 receives and rectifies the output of input power supply 1, and outputs the rectified result. Switching element 4 converts the DC output received from primary rectifier device 3 into an AC output so as to control a welding output. Main transformer 2 changes the voltage of the AC output received from switching element 4. The output of main transformer 2 is outputted as the welding output via secondary rectifier device 6 and reactor 5. Secondary rectifier device 6 rectifies the secondary output of main transformer 2. Welding voltage detector 9 detects a welding voltage, and welding current detector 8 detects a welding current.

Short-circuit/arc detector 10 determines whether the wire and the base material are contacted and short circuited with each other or the short-circuit is opened and an arc is created, based on a signal from welding voltage detector 9. Output controller 11 controls switching element 4 so as to control the welding output. The arc welding apparatus further includes wire feeder 19 and wire 16. Wire feed speed controller 13 controls wire feeder 19 so as to control the feed speed of wire 16. Time keeper 20 counts a predetermined time t1 since an arc is started. The time when the arc is started can be when an unillustrated welding start command unit starts welding, and wire 16 is fed toward base material 15. Alternatively, the time when the arc is started can be when a voltage is applied between wire 16 and base material 15 to contact them and to supply a current between them, and when the current is detected.

If the arc welding apparatus of the present first exemplary embodiment includes welding power supply 14, wire feeder 19, and an unillustrated welding torch, the welding start command unit is a switch of the welding torch.

If, alternatively, the arc welding apparatus of the present first exemplary embodiment includes welding power supply 14, wire feeder 19, an unillustrated industrial robot for holding an unillustrated welding torch, and an unillustrated teaching pendant to control the robot, the welding start command unit is a switch of the teaching pendant.

The arc welding apparatus further includes welding condition setting unit 12, which is communicatively connected either wired or wirelessly to welding power supply 14. Welding condition setting unit 12, which is used to set a welding current or a welding voltage, can be, e.g., a remote control. Welding power supply 14 has two output terminals: one is connected to tip 18 through which electric power is supplied to wire 16, and the other is connected to base material 15 to which electric power is supplied. Arc 17 is created between the end of wire 16 and base material 15.

Figure 2:
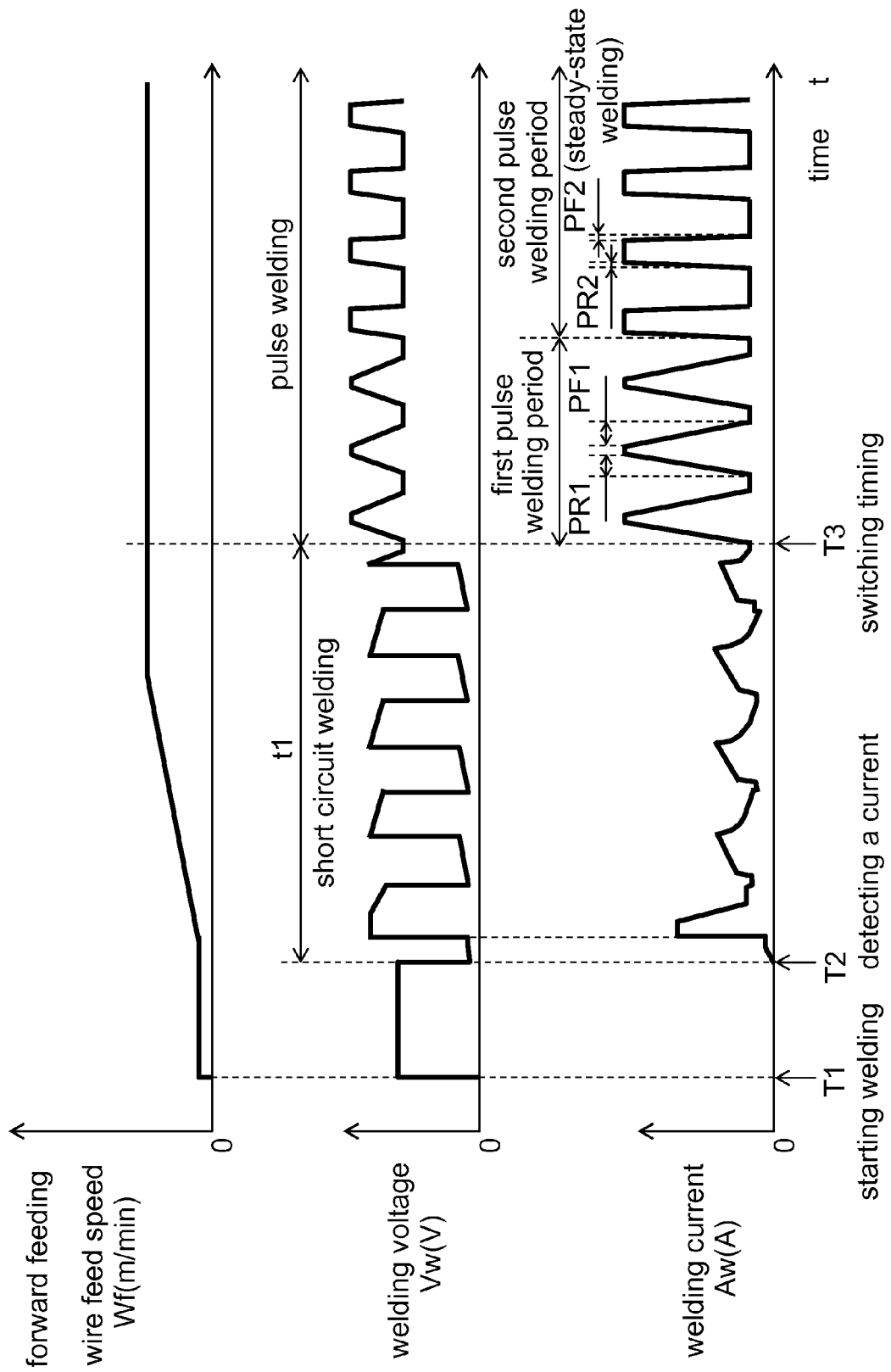
FIG. 2 shows waveforms of a welding current, a welding voltage, and a wire feed speed with time according to the first exemplary embodiment.

The following is a description of, with reference to FIG. 2, a wire feed speed Wf, a welding voltage Vw, and a welding current Aw in the arc welding apparatus of the present first exemplary embodiment. FIG. 2 shows waveforms of the wire feed speed Wf, the welding voltage Vw, and the welding current Aw with time.

As shown in FIG. 2, at the time T1, the arc welding apparatus is started (the start of welding is commanded). Next, wire feed speed controller 13 controls wire feeder 19 so that wire 16 is fed at a predetermined speed as shown by the waveform of the wire feed speed Wf. The predetermined wire feed speed is determined according to the welding current set by welding condition setting unit 12. The arc welding apparatus further includes an unillustrated storage unit, which stores a table or a formula where an average wire feed speed and a set welding current are corresponded to each other. The wire feed speed is determined from the contents in the storage unit and the welding current set by welding condition setting unit 12.

The time T2 is when an arc is started. When wire 16 and base material 15 are contacted and a welding current is supplied, welding current detector 8 detects the current. As a result, the time when an arc is started can be detected. Until the predetermined time t1 passes from the time T2, wire feed speed controller 13 controls wire feeder 19 so that wire 16 is fed at the predetermined speed. Output controller 11 performs short-circuit welding control so that a welding output is outputted.

Time keeper 20, which counts the time elapsed since the time T2, notifies output controller 11 that the predetermined time t1 has passed since the time T2 and the time T3 has been reached. Upon receiving the notice, output controller 11 switches the short-circuit welding control to the pulse welding control. In a first pulse-welding period, which is the first period during pulse welding, pulse rising slope is referred to as PR1 and pulse falling slope is referred to as PF1. In a steady-state welding period, pulse rising slope is referred to as PR2 and pulse falling slope is referred to as PF2. The pulse welding control is performed such that at least one of the slopes PR1 and PF1 is gentler than at least one of the slopes PR2 and PF2.

Thus, according to the method of the present invention for controlling arc welding, an arc is created between a welding wire as a consumable electrode and a base material as the object to be welded. In the method for controlling arc welding, short-circuit welding is started either at the time when the start of welding is commanded or the time when the start of welding is commanded and the contact between the welding wire and the base material is detected. The short-circuit welding is switched to pulse welding when a predetermined time has passed. In the method for controlling arc welding, the period to perform the pulse welding includes a first pulse-welding period and a second pulse-welding period following the first pulse-welding period. At least one of a pulse rising slope and a pulse falling slope in the first pulse-welding period is controlled to be gentler than at least one of a pulse rising slope and a pulse falling slope in the second pulse-welding period.

With this method, a pulse waveform different from the pulse waveform for steady-state welding is outputted when a predetermined time has passed since short-circuit welding control was started at arc start, and after a sufficiently large melt pool is formed, the pulse waveform for the steady-state welding is outputted. In this case, droplets formed immediately after short-circuit welding is switched to pulse welding are transferred to the melt pool without spattering. This reduces the generation of spatters after an arc is created and until the arc is stabilized.

The first pulse-welding period may be a period to output a predetermined number of pulses. With this method, the period after an arc is created and until the arc is stabilized can be defined by the number of pulses, thereby reducing the generation of spatters.

The predetermined number of pulses may be in the range of 1 to 8. With this method, the period after an arc is created and until the arc is stabilized can be defined more clearly by the number of pulses, thereby reducing the generation of spatters.

As shown in FIG. 2, when the first pulse-welding period ends, the second pulse-welding period starts immediately. The second pulse-welding period is the steady-state welding period where steady-state welding is performed. In the second pulse-welding period, at least one of the pulse rising slope PR2 and the pulse falling slope PF2 is outputted as the pulse waveform in the steady-state welding period.

With this method, the electromagnetic pinch force can be low in the first pulse-welding period. Because of this low electromagnetic pinch force, when pulse welding is started, droplets can be transferred to the small melt pool formed during short-circuit welding. Thus, pulse welding control in steady-state welding is started after the melt pool becomes large enough, thereby preventing spattering.

Thus, the method of the present invention for controlling arc welding, the second pulse-welding period may be a steady-state welding period, and the pulse waveform in the second pulse-welding period may be the pulse waveform in the steady-state welding period.

With this method, pulse welding control in steady-state welding is started after the melt pool becomes large enough, thereby preventing spattering.

Second Exemplary Embodiment

The method for controlling arc welding in a second exemplary embodiment differs from the method in the first exemplary embodiment mainly in that the wire is fed in alternating forward and backward directions at a predetermined frequency and amplitude in predetermined time t1 during short-circuit welding.

Figure 3:
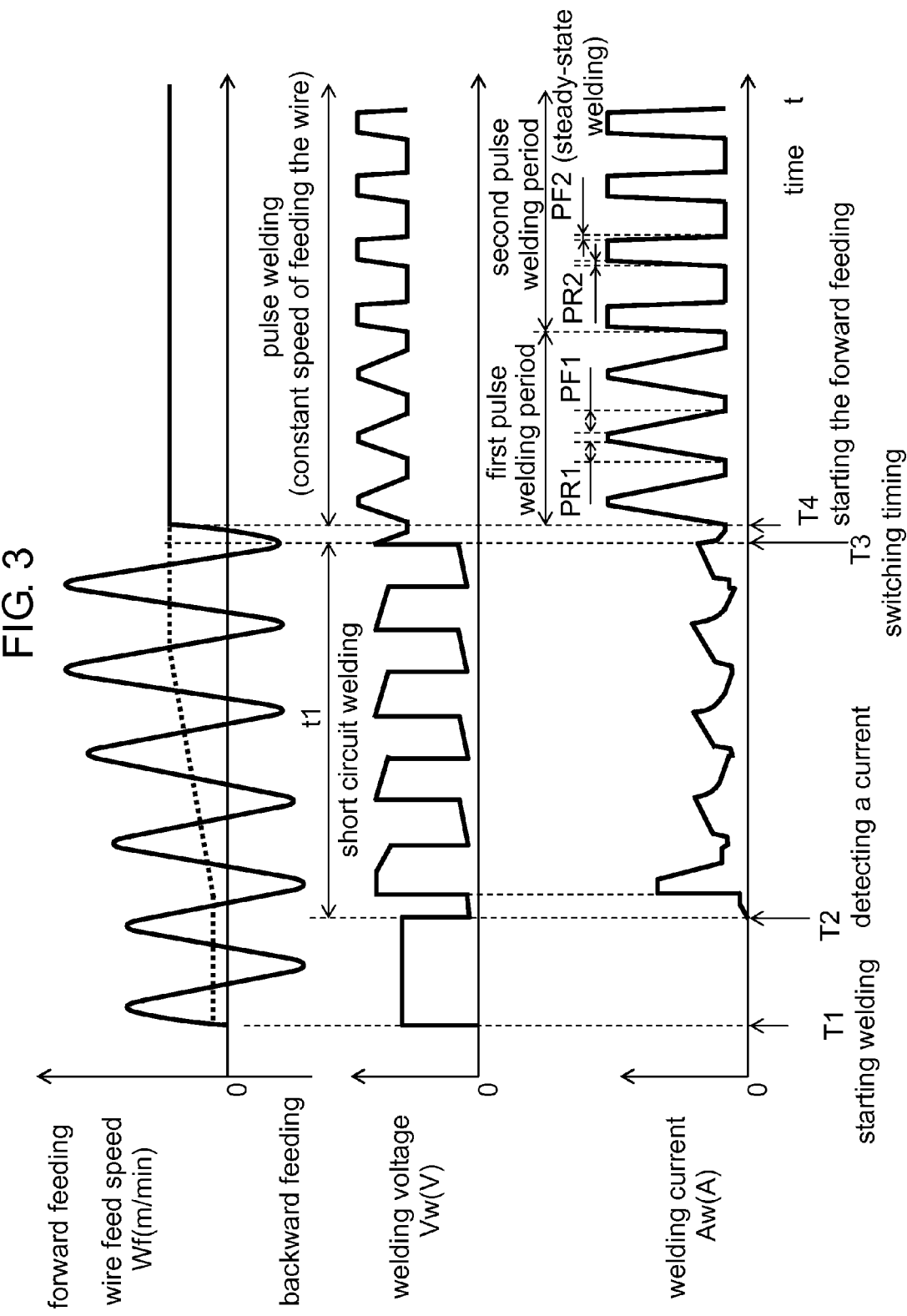
FIG. 3 shows waveforms of a welding current, a welding voltage, and a wire feed speed with time according to the second exemplary embodiment.
Figure 4:
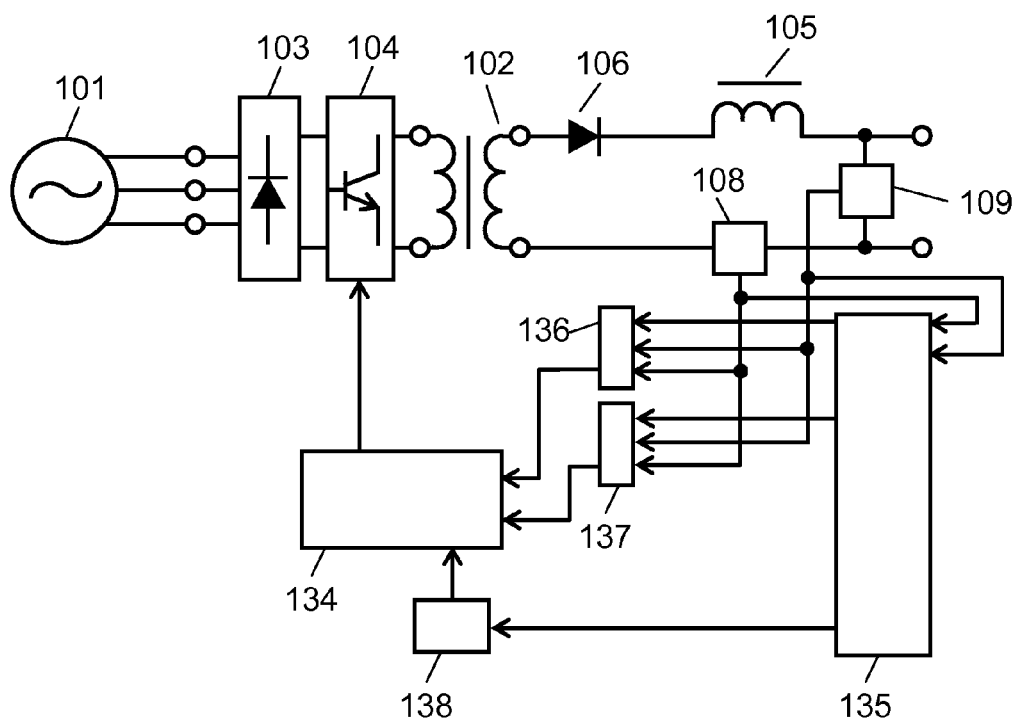
FIG. 4 is a schematic configuration view of a conventional arc welding apparatus.
Figure 5:
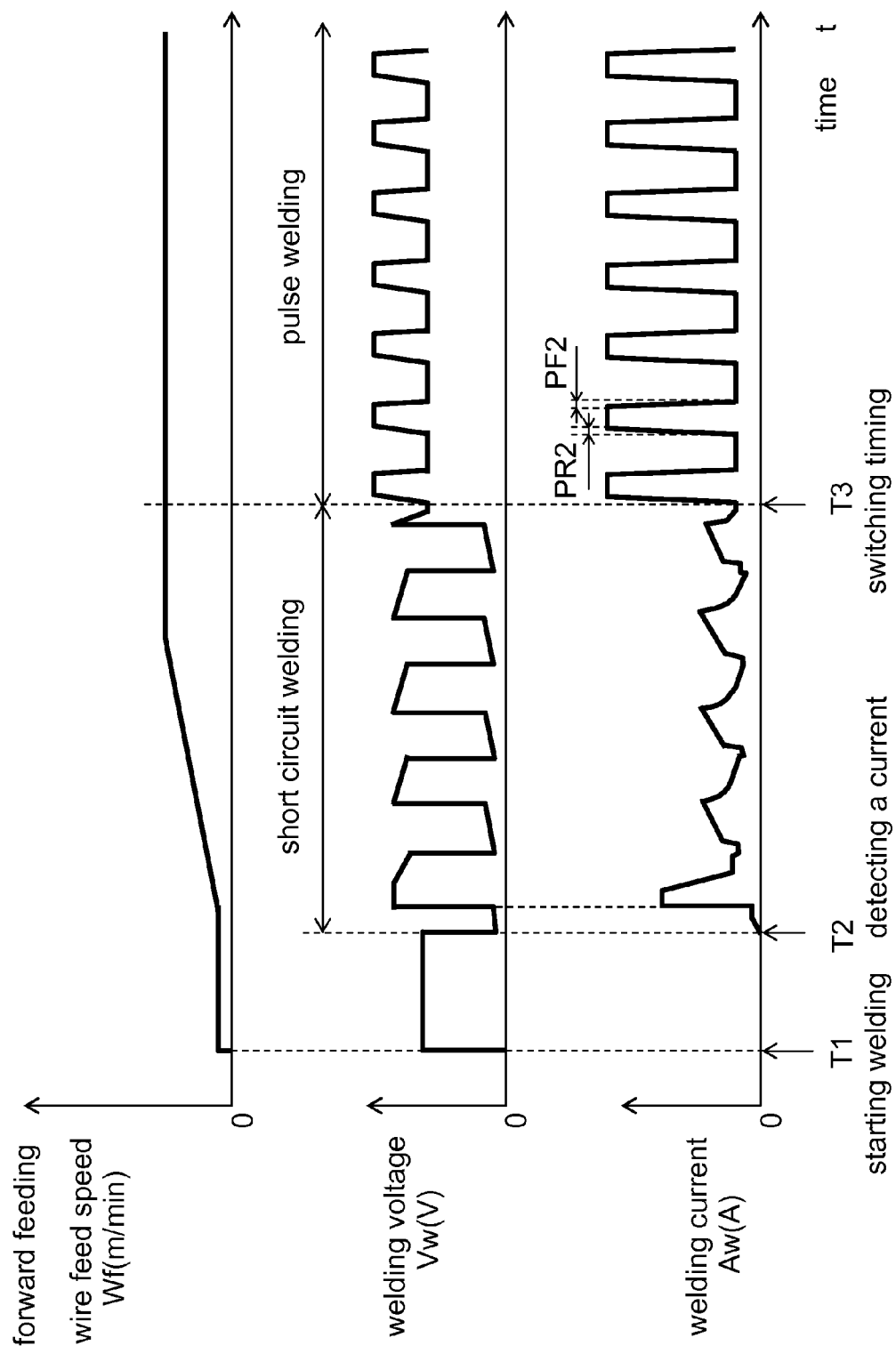
FIG. 5 shows waveforms of a wire feed speed, a welding voltage, and a welding current with time according to conventional arc welding.
Figure 6:
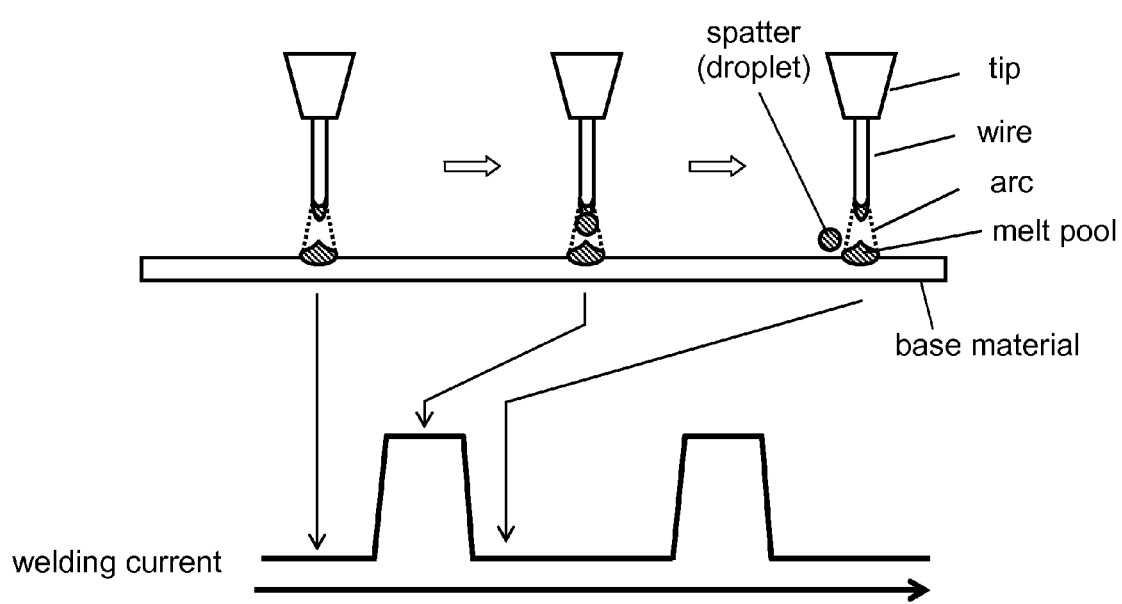
FIG. 6 shows the behavior of droplets when the base material has a small melt pool.

The present second exemplary embodiment will be described with reference to FIG. 1, which is the schematic configuration view of the arc welding apparatus, and FIG. 3. FIG. 3 shows waveforms of a welding current, a welding voltage, and a wire feed speed with time according to the second exemplary embodiment.

Until the predetermined time t1 has passed since the time T2, wire feed speed controller 13 controls wire feeder 19 so that wire 16 is fed at a predetermined frequency and amplitude. Time keeper 20, which counts the time elapsed since the time T2, notifies wire feed speed controller 13 that the predetermined time t1 has passed since the time T2 and the time T3 has been reached. Upon receiving the notice, wire feed speed controller 13 controls wire feed by switching the periodical waveform of the wire feed speed to a constant waveform. More specifically, when the predetermined time t1 has passed, the wire feed direction is switched from backward to forward. On and after the time when the wire feed speed reaches the constant speed determined according to the welding current set by welding condition setting unit 12, wire feed speed controller 13 controls wire 16 to be fed at the constant speed.

During the predetermined time t1 from the time T2 to the time T3, wire feed is periodically switched between forward and backward. More specifically, wire 16 is fed forward to cause a short circuit between wire 16 and base material 15, and is fed backward to open the short circuit so as to regenerate the arc.

The following is a description of the switching of welding output.

When wire feed reaches a time T4 when the wire is started to be fed forward as shown in FIG. 3, output controller 11 switches short-circuit welding control to pulse welding control. The pulse welding control is continued until the welding operation is completed. In the first pulse-welding period, the pulse welding control is performed such that at least one of the pulse rising slope PR1 and the pulse falling slope PF1 is gentler than at least one of the pulse rising slope PR2 and the pulse falling slope PF2 in the steady-state welding period. When the first pulse-welding period ends, the second pulse-welding period starts immediately. The second pulse-welding period is a steady-state welding period where pulse welding control is performed at least one of the pulse rising slope PR2 and the pulse falling slope PF2 is outputted as the pulse waveform in the steady-state welding period.

With this method, a short circuit during the short-circuit welding control can be opened without using the electromagnetic pinch force of the welding current. This reduces the generation of spatters and prevents spattering throughout the welding process from immediately after short-circuit welding control is started at arc start until pulse welding control is completed in the steady-state welding.

Thus, according to the method of the present invention for controlling arc welding, in a period to perform the short-circuit welding either at the time when the start of welding is commanded or the time when the start of welding is commanded and the contact between the welding wire and the base material is detected, the welding wire is fed at a speed in alternating forward and backward directions at a predetermined frequency and amplitude.

This method reduces the generation of spatters and prevents spattering throughout the welding process from immediately after short-circuit welding control is started at arc start until pulse welding control is completed in the steady-state welding.

The first pulse-welding period may be started while the speed of feeding the wire is changing as the direction to feed the wire is changing from backward to forward.

This method reduces the generation of spatters and prevents spattering throughout the welding process from immediately after short-circuit welding control is started at arc start until pulse welding control is completed in the steady-state welding.

The wire may be fed in alternating forward and backward directions at the predetermined frequency and amplitude in a predetermined time, and then may be fed at a constant speed. The first pulse-welding period may be started while the speed of feeding the wire is changing as the direction to feed the wire is changing from backward to forward, and is reaching the constant speed.

This method reduces the generation of spatters and prevents spattering throughout the welding process from immediately after short-circuit welding control is started at arc start until pulse welding control is completed in the steady-state welding.

INDUSTRIAL APPLICABILITY

The method of the present invention for controlling arc starting can prevent the generation and adhesion of spatters at arc start, thereby increasing the productivity of welding process. This method is industrially useful as a welding method with a consumable electrode.

REFERENCE MARKS IN THE DRAWINGS 1 input power supply
2 main transformer
3 primary rectifier device
4 switching element
5 reactor
6 secondary rectifier device
8 welding current detector
9 welding voltage detector
10 short-circuit/arc detector
11 output controller
12 welding condition setting unit
13 wire feed speed controller
14 welding power supply
15 base material
16 wire
17 arc
18 tip
19 wire feeder
20 time keeper

The invention claimed is:

1. A method for controlling pulse arc welding where an arc is created between a welding wire as a consumable electrode and a base material as an object to be welded, including
  performing a short circuit welding in a short-circuit welding period which starts either at a time when the start of welding is commanded or a time when the start of welding is commanded and a contact between the welding wire and the base material is detected,
  performing a first pulse arc welding having a first pulse repeated N times for welding current in a first pulse-welding period after the short-circuit welding period, where N is a predetermined integer number >1, and
  performing a second pulse arc welding having a second pulse repeated M times for welding current in a second pulse-welding period after the first pulse-welding period, where M>1,
  wherein each of the N first pulses for welding current comprises a common first rising slope and a common first falling slope,
  each of the M second pulses for welding current comprises a common second rising slope and a common second falling slope, and
  the common first rising slope is more gradual than the common second rising slope, or the common first falling slope is more gradual than the common second falling slope.

2. The method of claim 1, wherein
N is the predetermined integer number not more than 8.

3. The method of claim 1, wherein
  the second pulse-welding period is a steady-state welding period, and
  the second pulse waveform is a pulse waveform in the steady-state welding period.

4. The method of claim 1, wherein in the short-circuit welding period, the welding wire is fed at a speed in alternating forward and backward directions at a predetermined frequency and amplitude.

5. The method of claim 4, wherein
the first pulse-welding period is started while the speed of feeding the welding wire is changing as a direction to feed the welding wire is changing from backward to forward.

6. The method of claim 5, wherein
the welding wire is fed at a constant speed in the first pulse-welding period.

7. A method for controlling pulse arc welding where an arc is created between a welding wire as a consumable electrode and a base material as an object to be welded, including
performing a short-circuit welding in a short-circuit welding period which starts either at a time when the start of welding is commanded or a time when the start of welding is commanded and a contact between the welding wire and the base material is detected,
performing a first pulse arc welding having a first pulse for welding current in a first pulse-welding period after the short-circuit welding period, and
performing a second pulse arc welding having a second pulse for welding current in a second pulse-welding period after the first pulse-welding period,
wherein a first pulse waveform of the first pulse for welding current comprises a first rising slope and a first falling slope,
a second pulse waveform of the second pulse for welding current comprises a second rising slope and a second falling slope,
the first rising slope is more gradual than the second rising slope, or the first falling slope is more gradual than the second falling slope, and
a peak time of the first pulse is shorter than a peak time of the second pulse.

8. The method of claim 7, wherein
the first pulse-welding period is a period to output a predetermined number of pulses for welding current which is in a range of 1 to 8.

9. The method of claim 7, wherein
a first cycle length of the first pulse is the same as a second cycle length of the second pulse.

10. The method of claim 7, wherein
the second pulse-welding period is a steady-state welding period, and
the second pulse waveform is a pulse waveform in the steady-state welding period.

11. The method of claim 7, wherein
in the short-circuit welding period, the welding wire is fed at a speed in alternating forward and backward directions at a predetermined frequency and amplitude.

12. The method of claim 11, wherein
the first pulse-welding period is started while the speed of feeding the welding wire is changing as a direction to feed the welding wire is changing from backward to forward.

13. The method of claim 12, wherein
the welding wire is fed at a constant speed in the first pulse-welding period.

14. A method for controlling pulse arc welding where an arc is created between a welding wire as a consumable electrode and a base material as an object to be welded, including
performing a short-circuit welding in a short-circuit welding period which starts either at a time when the start of welding is commanded or a time when the start of welding is commanded and a contact between the welding wire and the base material is detected, and
performing a first pulse arc welding having a first pulse for welding current in a first pulse-welding period after the short-circuit welding period,
performing a second pulse arc welding having a second pulse for welding current in a second pulse-welding period after the first pulse-welding period,
wherein a first pulse waveform of the first pulse for welding current comprises a first rising slope and a first falling slope,
a second pulse waveform of the second pulse for welding current comprises a second rising slope and a second falling slope,
the first rising slope is more gradual than the second rising slope, or the first falling slope is more gradual than the second falling slope, and
a first current quantity of the first pulse is the same as a second current quantity of the second pulse.

15. The method of claim 14, wherein
the first pulse-welding period is a period to output a predetermined number of pulses for welding current which is in a range of 1 to 8.

16. The method of claim 14, wherein
a first cycle length of the first pulse is the same as a second cycle length of the second pulse.

17. The method of claim 14, wherein
the second pulse-welding period is a steady-state welding period, and
the second pulse waveform is a pulse waveform in the steady-state welding period.

18. The method of claim 14, wherein
in the short-circuit welding period, the welding wire is fed at a speed in alternating forward and backward directions at a predetermined frequency and amplitude.

19. The method of claim 18, wherein
the first pulse-welding period is started while the speed of feeding the welding wire is changing as a direction to feed the welding wire is changing from backward to forward.

20. The method of claim 19, wherein
the welding wire is fed at a constant speed in the first pulse-welding period.

* * * * *